TELEPHONE SIGNALING DEVICE

Filed Dec. 9, 1963 3 Sheets-Sheet 1

INVENTOR
F. K. WURST
BY
SE Hollander
ATTORNEY

Jan. 31, 1967 F. K. WURST 3,301,968

TELEPHONE SIGNALING DEVICE

Filed Dec. 9, 1963 3 Sheets-Sheet 3

United States Patent Office 3,301,968
Patented Jan. 31, 1967

3,301,968
TELEPHONE SIGNALING DEVICE

Francis K. Wurst, Scotch Plains, N.J., assignor to American Telephone and Telegraph Company, New York, N.Y., a corporation of New York Filed Dec. 9, 1963, Ser. No. 329,020
12 Claims. (Cl. 179—90)

This invention relates to signaling devices and particularly to telephone calling devices for transmitting signals over telephone lines.

More specifically, this invention relates to telephone call transmitters of the finger wheel type adapted to selectively transmit dial pulses and other control signals over telephone lines.

In a very particular aspect, this invention relates to a telephone dial adapted to transmit on an alternate basis dial pulses and special signals wherein the special signals can be selected independently of the dialing action.

In the past, commercial telephone networks were used almost exclusively for the transmission of voice communications. Special communications such as data and the like, were transmitted over private facilities that were specially designed to fit the particular needs of the individual customers requiring that type of communication.

Commercial telephone networks, however, have now expanded to a degree where nationwide dialing is a reality for many customers, and international dialing is not unforeseeable.

The need for more extensive voice communication facilities has also been accompanied by a similar need for special communication facilities, and, while separate networks could be provided for the special communications, new techniques have made it more practical to transmit these special communications over the commercial telephone voice networks.

While most telephone switching systems offer a wide variety of customer services, the service requirements of data customers are often so individualistic that it has been found advantageous to allow the data customers to exercise special control over their connections through a combined telephone and data switching network. This can be accomplished by furnishing the customers with special instruments which enable them to transmit control signals along with conventional dialing signals to the central office. At the central office, equipment responsive to the control signals is provided to perform a virtually unlimited variety of unique functions such as special routing, pre-emption, or to provide access to special transmission equipment, etc.

It is, therefore, one object of my invention to provide a telephone calling device which permits the user to transmit special signals along with convention dial signals to inform central office switching equipment of the special nature of the call.

Dial telephone systems are known whereby customers are permitted to direct their connections in different ways, however, these systems often require that the customer "prime" the central office switching equipment with a special code by manipulating his dial several times in addition to the dialing of the regular called address code. While these arrangements are suitable, the central office equipment responsive to these signals must generally be held for longer periods to register the additional information.

It is, therefore, another object of my invention to improve calling devices by transmitting the special control signals during the time interval it takes for the customer to dial the regular address code.

In addition to the need for directing the establishment of connections in a special manner, certain customers require end-to-end signaling over the established telephone connection to actuate special station equipment, such as recording devices, computers and the like, at the called customer's station. Since the telephone connection is generally controlled by the operation of the station switchhook contacts which open and close a direct-current loop, other signaling means must be furnished to permit signaling over the established connection so as not to cause premature disconnects.

It is, therefore, a further object of my invention to provide a call transmitting device conveniently arranged to transmit conventional dial impulses and special alternating current signals selectively controlled by the customer.

In accordance with one illustrative embodiment of my invention, a standard telephone dial is provided and arranged to transmit conventional dial impulses over a telephone line.

Mechanically coupled to the dial is a rotary stepper switch having a stationary bank of contacts which can be selectively connected, by means independent of the dial, to a multifrequency pulse generator. Wipers are arranged to engage a pair of switch contacts as the wipers are rotated under control of the dial finger wheel, and these wipers are electrically connected to the telephone line through a suitable brush and commutator arrangement. The coupling between the standard dial and the stepper switch comprises a ratchet and pawl mechanism. This mechanism is arranged to advance the wipers over successive pairs of stepper switch contacts for each forward "pull" or clockwise rotation of the dial finger wheel. As the wipers pass over a pair of contacts, a signal from the MF pulse generator connected to those contacts is transmitted through the brush and commutator arrangement and over the telephone line. When the dial finger wheel is released and returns to normal, dial impulses are transmitted over the line in the conventional manner, but the stepper switch remains in position to be advanced over subsequent contact pairs upon the dialing of the succeeding digits.

Thus, it can be seen that dial pulses and multifrequency pulses are transmitted alternately and not simultaneously. The dial pulses, which comprise the address code of the called customer, direct the conventional switching functions while the multifrequency control signals can be used to perform some of the special circuit functions mentioned above.

At the end of the dialing the ratchet mechanism remains in its wound position until it is released by the customer through the operation of a plunger or other suitable release mechanisms, and when the ratchet is released, the wipers are returned to their normal or starting position. At this time, further actuation of the dial finger wheel by the calling customer will cause the transmission of multifrequency signals over the established telephone connection to actuate special equipment, such as a computer or recording device, connected to the called customer's line. Although dial pulses are also transmitted over the line at this time, they do not adversely affect the established connection.

Accordingly, one feature of my invention resides in a call transmitter adapted to alternately transmit dial pulses to perform switching functions and control signals to perform special circuit functions.

Another feature of my invention includes means for selecting the control signals independently of the digits dialed.

A further feature of my invention is found in a telephone call transmitter wherein means are provided for transmitting alternating-current signals along with conventional dial pulse signals wherein successive alternating-current signals can be selectively varied independently of the dial pulse signals.

These and other objects and features will be readily apparent from the following description with respect to the drawing in which.

Figure 1:
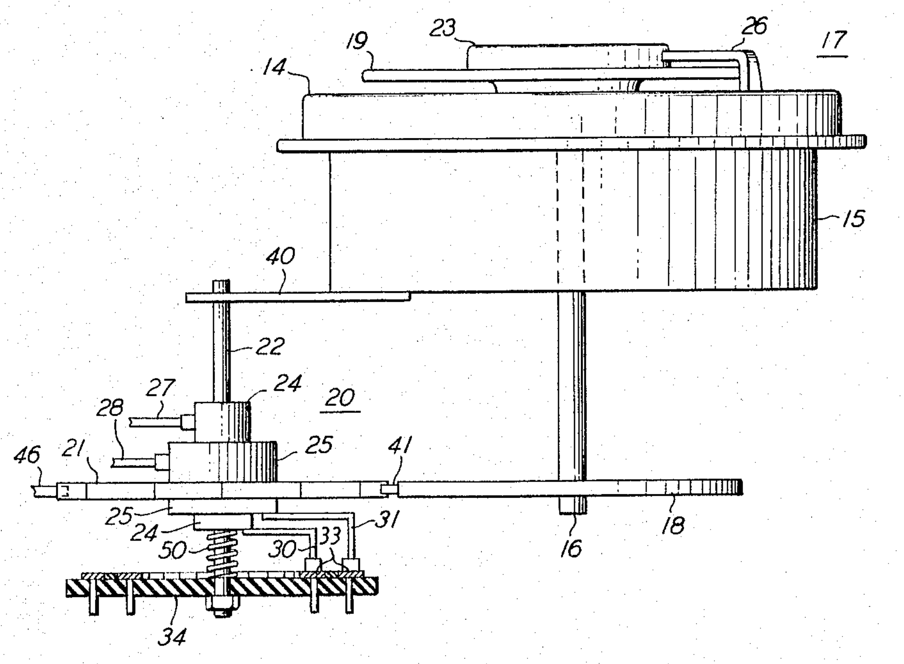
FIG. 1 shows a side elevation of a calling device in accordance with one illustrative embodiment of my invention.

For ease of illustration the same reference designations are maintained in each figure for those parts which may appear in several figures of the drawing.

Turning now to the drawing, in FIG. 1 there is depicted one illustrative embodiment of my invention in association with a standard dial mechanism 17. As my invention is adaptable for utilization with any dial mechanism, the specific details of the dial mechanism, including the motor spring, governor, pulsing contacts, and requisite gears are not depicted but are understood to be included within the housing 15. In the drawing the external parts of the dial mechanism 17 that can be discerned include the finger wheel 19, the finger stop 26, the central card holder 23, and the number plate and cover 14.

Additionally, and in accordance with an aspect of my invention, the main shaft 16 of the dial mechanism 17 has attached to it a disc 18 which is utilized, as explained further below, to drive, by a ratchet and pawl mechanism, the stepper switch 20. Stepper switch 20, in this embodiment of my invention, includes a ratchet wheel 21 secured on a shaft 22. Also secured on the shaft and insulated from each other are an inner commutator 24 and an outer commutator 25. Brushes 27 and 28 ride on the inner and outer commutators, respectively, above the ratchet wheel 21.

Secured to the lower sides of the commutators are conducting wipers or fingers 30 and 31. These wipers ride on pairs of contacts 33 which can best be seen in the plane view of contact plate 34 shown in FIG. 2. Contact plate 34 comprises a disc of nonconducting material having a plurality of contact pairs 33 disposed about the periphery of the disc wherein one contact from each pair defines an outer circle of contacts and the other contact from each pair defines an inner circle of contacts separated from the outer circle by insulating ring 36. The contacts of a particular pair are separated from adjacent contact pairs by insulating segments 37. Attached to the bottom side of contact plate 34, as seen in FIG. 3, are signal input terminal pairs designated 1–12, each connected to a contact pair 33 and thus through the wipers 30, 31 to the commutators 24 and 25. Input terminals 1–12 are connected through corresponding switches designated S1–S12 to a signal source, such as multifrequency pulse generator 38. Pulse generator 38, which may be of any type known in the art, generates distinctive control signals such as the well-known two-out-of-five or two-out-of-six multifrequency signals used in telephone switching.

Figure 2:
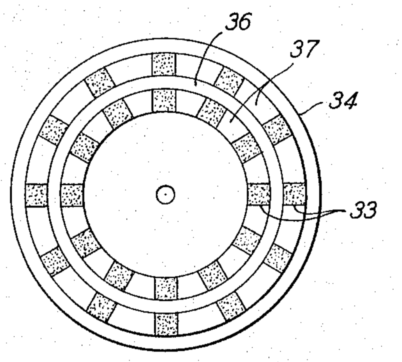
FIG. 2 shows a plane view of the multicontact bank arrangement.
Figure 3:
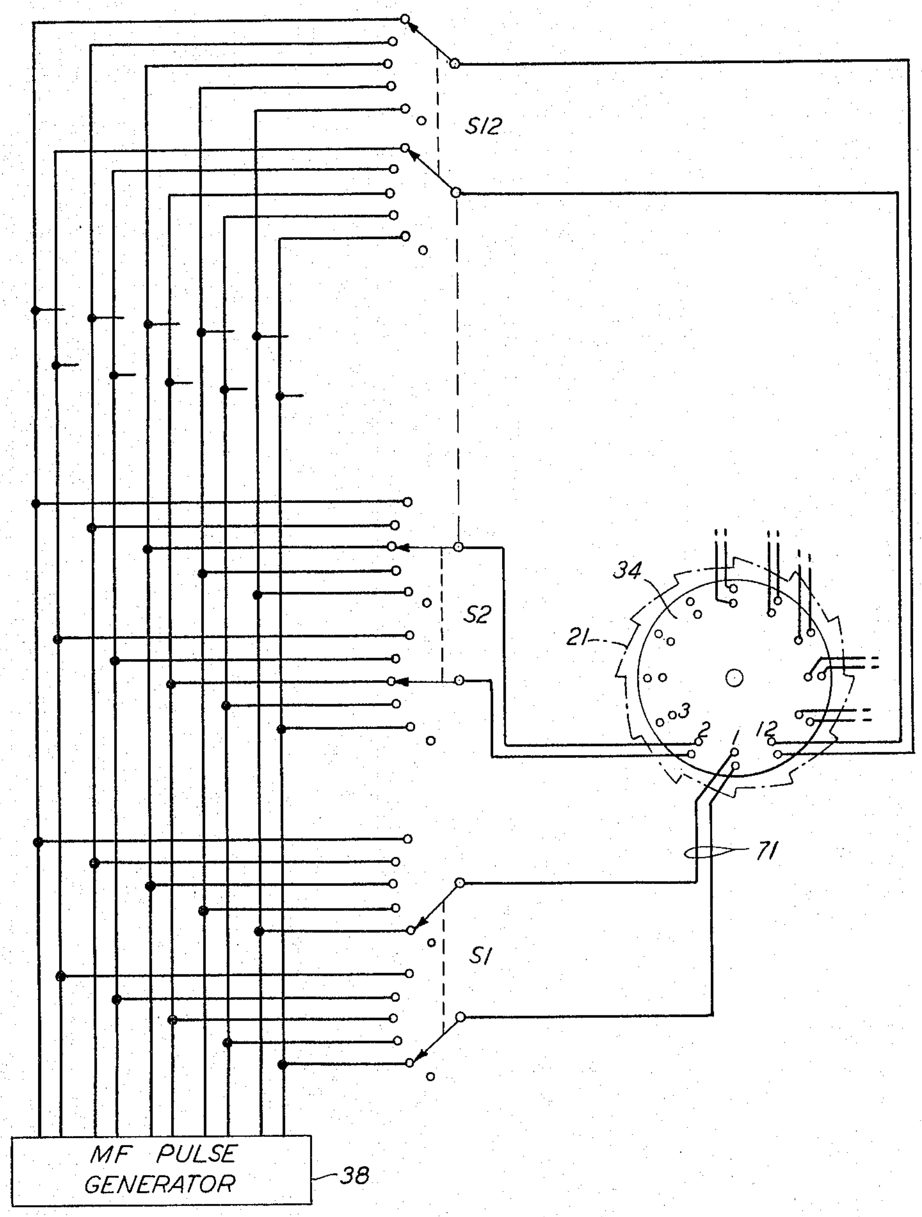
FIG. 3 shows the manner in which a source of multifrequency control signals can be coupled to the calling device.

While I have shown twelve contact pairs on contact plate 34 in FIG. 2 the number of active contact pairs 33 will depend on the information content of the special signal to be transmitted along with the dial pulse information. Each of the input terminals 1–12 is connected to a corresponding rotary switch S1–S12, and rotary switches S1–S12 can be selectively set so as to connect any of the signals from multifrequency pulse generator 38 to any of the input terminals 1–12 of contact plate 34.

Although I have shown rotary switches for interconnecting pulse generator 38 with input terminals 1–12, other suitable arrangements might be used without departing from the spirit and scope of the invention. For instance, a connector assembly, adapted to receive a punched card or printed circuit card, could be arranged between the pulse generator and the signal input terminals. The customer would then merely insert a card in the connector to connect the proper control signals to the input terminals.

The shaft 22 of the stepper mechanism may be secured to the telephone housing or to the dial mechanism 17, as by a bracket 40 shown in FIG. 1. It is to be understood that the shaft 22 and the contact plate 34 are stationary, while the ratchet wheel 21, the commutators 24 and 25 and the wipers 30 and 31 attached thereto are movable.

In operation, the customer rotates finger wheel 19 of the dial mechanism 17 in a clockwise manner (when viewed from the top) to wind the motor spring of the dial mechanism and also to rotate drive disc 18. By means of the pawl 41, disc 18 drives or "steps" ratchet wheel 21 one position. In so doing wipers 30 and 31, which had been positioned on an insulated segment 37 of contact plate 34 between contact pairs 33, are caused to pass over one pair of contacts, thereby causing the distinctive signal connected to that pair of contacts from the pulse generator 38 to be sent, through the commutators 24 and 25 and brushes 27 and 28 to the subscriber's telephone line.

During the counterclockwise or return rotation of the finger wheel 19, the dial pulses are transmitted to the line by the standard dial mechanism 17. During this period when finger wheel 19 is returning to normal, pawl 41 is depressed as it passes over ratchet wheel 21 causing the pawl spring 10 (FIG. 4) to compress, but ratchet wheel 21 is prevented from returning to its normal or home position by detent pawl 46, and wipers 30 and 31, rest on an insulated portion 37 of the contact plate 34 between the contact pairs 33. In this manner it can be seen that the dial pulses and the multifrequency control signals are sent out alternately and not simultaneously.

On subsequent "pulls" of the finger wheel, the above action is repeated advancing ratchet wheel 21 one step and causing a distinct control signal to be momentarily transmitted, as a burst or pulse, on the telephone line for each "pull" of the finger wheel 19.

As the ratchet wheel 21 thus advances, a spring 50 is wound. The ratchet wheel 21 remains in its wound position after dialing is finished until detent mechanism 46 is actuated thus permitting the spring 50 to unwind and return the ratchet wheel 21 to its starting position. Detent 46 is actuated by means of a mechanical linkage (shown in FIG. 4) which may couple the detent to the switchhook plunger or to other suitable release mechanisms.

Figure 4:
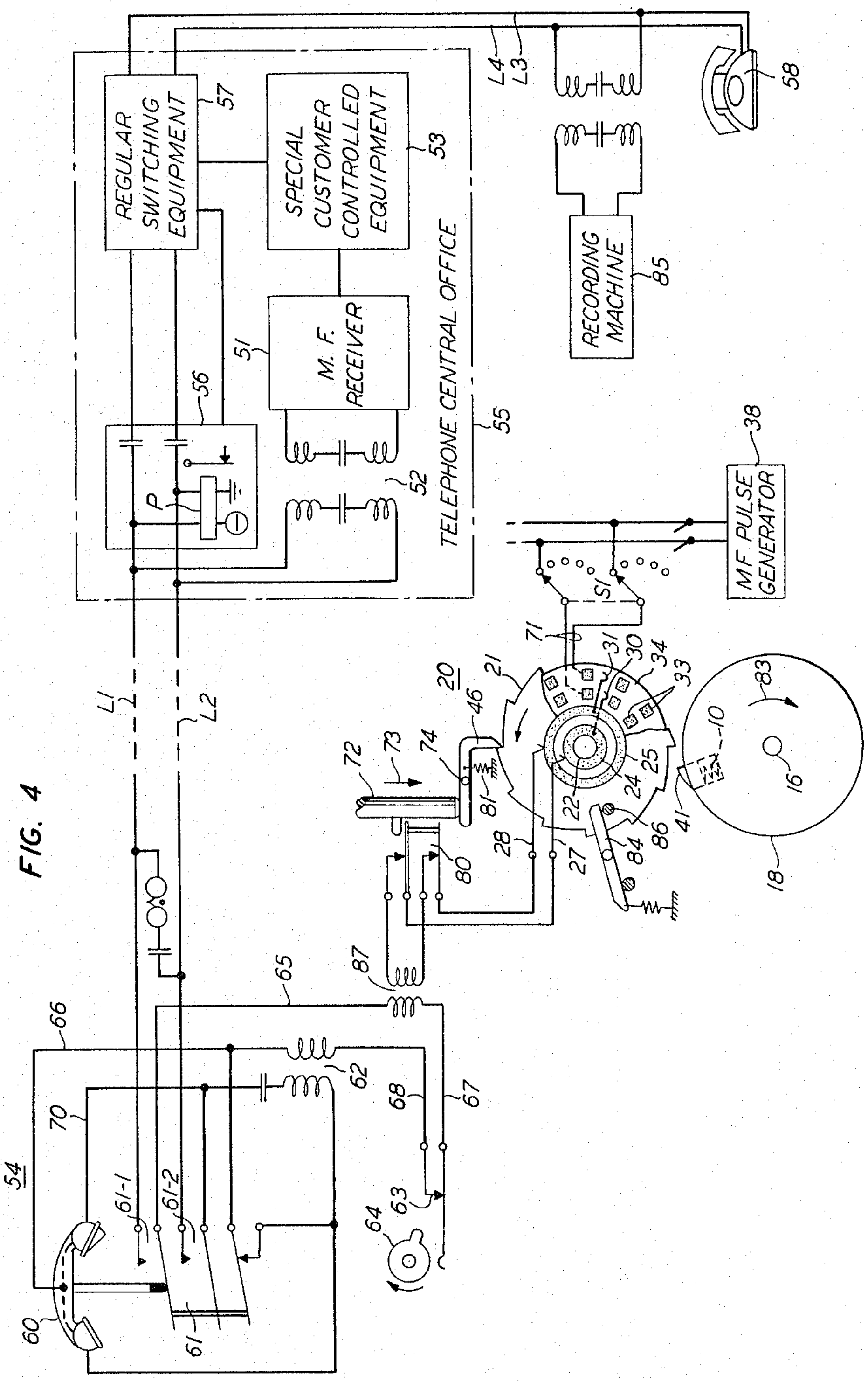
FIG. 4 is a schematic representation of the calling device as used in a telephone system.

Turning now to FIG. 4, there is shown a schematic representation of my invention employed in a telephone system. Subscriber station 54 is connected over line conductors L1 and L2 to the telephone central office 55. For simplicity, the telephone central office 55 has been depicted in block diagram form, and it is to be understood that the equipment represented by the block diagram can be any of the well known types of switching equipment.

Subscriber line conductors L1 and L2 are shown connected to pulsing relay P in a register circuit 56 which is responsive to dial pulses to actuate the regular telephone switching equipment 57 for establishing a connection to a called customer, such as customer 58, over line conductors L3 and L4.

To detect special control signals transmitted by a calling customer, a multifrequency receiver 51 is coupled to line conductors L1 and L2 via coil 52. Of course, it will be readily apparent that multifrequency receiver 51 could be coupled at some other convenient point in the transmission path such as at the common trunks or junctors which are used by a plurality of subscribers.

Multifrequency receiver 51 functions to receive multifrequency control signals which are transmitted by a calling customer at station 54 to actuate special customer control equipment 53 and the latter, thereafter, performs the appropriate special service functions in accordance with the special control signals received. For instance, customer controlled equipment 53 might inform the regular switching equipment 57 to establish a high grade transmission facility including special amplifiers and the like between stations 54 and 58. Similarly, customer controlled equipment 53 might inform the regular switching equipment 57 that the call requires special billing or special routing which necessitates the pre-emption of facilities from other customers. These and other special circuit functions are accomplished by circuitry which is well known and need not be disclosed in detail herein for a complete understanding of my invention.

At the left of FIG. 4 is shown a subscriber station 54 which comprises a telephone set adapted to transmit conventional dial pulses and special control signals over line conductors L1 and L2. More specifically, station 54 includes a transmitter and receiver assembly 60 connected to line conductors L1 and L2 via switchhook contacts 61. Also connected to the line conductors are pulsing contacts 63 which are momentarily opened and closed by the rotation of impulse wheel 64 to interrupt the subscriber loop.

Impulse wheel 64, of course, is part of a standard dial mechanism not shown in detail, and impulse wheel 64 is rotated when the dial finger wheel returns to normal under control of the dial motor spring and governor mechanism not shown herein.

When station 54 goes off hook by lifting the transmitter and receiver assembly 60, a direct-current loop is completed to operate pulsing relay P. This circuit can be traced from battery through the left-hand winding of relay P, over conductor L1, through switchhook contacts 61-1, over conductor 65, through one winding of coil 87, over conductor 67, through normally closed pulsing contacts 63, over conductor 68, through one winding of induction coil 62, over conductor 66, through the transmitter circuit, over conductor 70, through switchhook contacts 61-2, over conductor L2 and through the right-hand winding of relay P to ground. Relay P operates over this circuit and will follow the circuit interruptions caused by the opening and closing of pulsing contacts 63 under control of impulse wheel 64.

Also connected to conductors L1 and L2, via coil 87 and switch 80, are brushes 27 and 28 which engage the inner and outer commutators 24 and 25, respectively, of rotary stepper switch 20. Attached to the underside of the inner and outer commutators and extending therefrom, are wipers 30 and 31 which can be seen below the cut-away portion of ratchet wheel 21. The cut-away portion of ratchet wheel 21 also exposes a portion of contact plate 34 and four of the contact pairs 33.

It will be recalled from the previous description that each of the twelve contact pairs is extended through contact plate 34 to a corresponding pair of input terminals designated 1–12 and these terminals are in turn connected to a signaling source via switches S1–S12. In FIG. 4, the arrangement for terminal pair 1 is shown and that pair is connected through switch S1 to multifrequency pulse generator 38 over conductors 71. It is to be understood that the other input terminals 2–12 may be connected to a source of signals in like manner. Contact plate 34 bearing the twelve contact pairs 33 is fixed while ratchet wheel 21, commutators 24 and 25 and wipers 30 and 31 attached thereto, are free to rotate on shaft 22.

Located adjacent to ratchet wheel 21, and in the same plane, is driving disc 18 which is attached to the main shaft 16 of dial mechanism 17 (shown in FIG. 1). When the finger wheel of dial mechanism 17 is rotated off-normal in a clockwise direction to one of its off-normal positions representing a particular digit to be dialed, driving pawl 41 on disc 18 engages a tooth of ratchet wheel 21 and rotates the ratchet wheel one step.

Also located adjacent to ratchet wheel 21 is a detent mechanism 46 which is held against ratchet wheel 21 by spring 81 when release plunger 72 is in its extended position as shown. When plunger 72 is actuated in the direction of arrow 73, however, detent 46 rotates on shaft 74 and disengages from the ratchet wheel 21 thereby permitting ratchet wheel 21 to return to its normal or home position under control of a motor spring 50 which can best be seen in FIG. 1. Plunger 72 may be operated independently or plunger 72 may be coupled to the switchhook to afford the automatic return of switch 20 to normal when the customer hangs up.

Thus, in operation, the selection of the multifrequency control signals to be transmitted and the particular sequence in which they are to be transmitted would be accomplished by the operation of manual switches S1–S12 in the appropriate manner. The customer would then lift his telephone receiver 60 at station 54, and upon receipt of dial tone from central office 55, dial the address code of the called customer, such as customer 58. When the customer rotates the finger wheel of his dial mechanism in a clockwise direction to wind-up the dial motor spring, disc 18 is also rotated clockwise (as indicated by the arrow 83) so that driving pawl 41 engages one tooth of ratchet wheel 21 thus rotating the ratchet one step in a counterclockwise direction. When ratchet wheel 21 rotates one step, wipers 30 and 31 pass over one of contact pairs 33 to transmit the multifrequency signal present on that contact pair through commutators 24 and 25, brushes 27 and 28, switch 80, through coil 87 and over conductors L1 and L2 to the telephone central office 55 where the multifrequency pulse is received by multifrequency receiver 51.

After the dial finger wheel has been rotated from its normal position to an off-normal position representing one digit in the called station address code, the customer releases the finger wheel and the dial motor spring causes the finger wheel to return to its normal position. At this time, dial shaft 16 rotates disc 18 in a counterclockwise direction to return driving pawl 41 to its normal position. Detent mechanism 46, by engaging a tooth of ratchet wheel 21 at this time, prevents the ratchet wheel from returning to normal under control of its motor spring 50.

While the dial finger wheel is returning to normal, impulse wheel 64 is rotated to intermittently open contacts 63 in accordance with the digit dialed. To simplify the drawing, the dial motor spring, governor, etc. for rotating impulse wheel 64, has not been shown, and it is to be understood that any of the mechanisms found in standard telephone dials to accomplish this function will be applicable to my invention.

The intermittent closing and opening of pulsing contacts 63 causes pulsing relay P at the central office to operate and release and thus register the digit dialed in dial pulse register 56. After sufficient digits have been registered in dial pulse register 56, the regular switching equipment 57 is directed to establish a connection to customer 58 in a well-known manner.

Thus, each digit dialed by the customer at station 54 is preceded by a control pulse comprising a multifrequency signal which is selected independently of the digits dialed. In other words, the customer at station 54 may dial the address code assigned to the customer at station 58, and depending on the setting of switches S1–S12, transmit many combinations of control signals even though the same address code is dialed. This enables the customer at station 54 to control a connection to customer 58 in many ways depending upon the particular control signals transmitted.

For purposes of illustration, let it be assumed that multifrequency control signals were transmitted by station 54 along with the address code of station 58 and that these control signals informed special customer controlled equipment 53 that high grade transmission facilities are required on the connection. Logic circuitry (not shown) in equipment 53 would direct the regular switching equipment 57 to select certain trunks to which amplifiers can be selectively coupled for this call.

Having once established the connection, the customer at station 54 can converse with the customer at station 58 over line conductors L1–L4.

Let it now be assumed, that a connection has been established between stations 54 and 58 in the above manner and that the customer at station 54 desires to actuate certain special equipment, such as recording machine 85 at station 58. As is well known, connections through a telephone system like the one described herein, would permit the passage of voice and alternating currents but block the passage of direct-current signals between a calling and called station. Usually, the calling and called station are each connected to separate direct-current loops which furnish the necessary talking battery and supervision, and the two loops are voice coupled via a repeat coil or condenser network. While end-to-end signaling has been proposed in some prior arrangements using transients, caused for instance, by the interruption of the calling loop, these arrangements have inherent disadvantages. Namely, the signaling transients are difficult to distinguish from transients which occur on a line due to noise and the like.

In accordance with one aspect of my invention, however, a convenient end-to-end signal arrangement is provided using the calling device described above. It will be recalled that for each digit of the address code dialed, ratchet wheel 21 of rotary switch 20 was stepped one position and was retained off-normal by detent 46. At the end of dialing ratchet wheel 21 will, therefore, have stepped several positions in accordance with the number of digits dialed. In its wound position ratchet wheel 21 has tensioned motor spring 50 (best seen in FIG. 1) so that the actuation of detent 46 will permit motor spring 50 to unwind and return ratchet wheel 21 to normal.

Now, should the customer at station 54 decide to signal from end-to-end over an established telephone connection, he can momentarily depress release plunger 72 to disengage detent 46 from ratchet wheel 21, thereby permitting ratchet wheel 21 to return to normal, the normal position being reached when pin 86 returns to stop 84. Plunger 72, in operating, also opens contacts 80 to momentarily disconnect brushes 27 and 28 from line conductors L1 and L2 to prevent any multifrequency control signals from being transmitted over the line as ratchet wheel 21 returns wipers 30 and 31 to normal.

After reachet wheel 21 has returned to normal, the customer at station 54 can actuate his dial to "step" switch 20 and transmit control signals end-to-end over the established connection to control recording machine 85, and the particular control signals, of course, will be determined by the setting of switches S1–S12. Although dial pulses will also be transmitted over the line at this time, the dial pulses will not adversely affect the established connection.

It is to be understood that the above-described arrangements are merely illustrative of the application of the principles of the invention. Numerous other arrangements may be devised by those skilled in the art without departing from the spirit and scope of the invention.

What is claimed is:

1. A telephone signaling device comprising a dial having a normal position and rotatable in a first direction to selected off-normal positions and rotatable in a second direction from said selected off-normal positions to said normal position, first means controlled by said dial for each successive rotation to a selected off-normal position for sequentialy transmitting a selected signal in a series of first signals comprising a word group, said first means including means for selecting from a plurality of signals said first signals independently of said off-normal position, and second means controlled by said dial when rotated from a selected one of said off-normal positions to said normal position for transmitting a second signal indicative of said selected off-normal position.

2. A telephone signaling device for alternately transmitting different signals comprising a dial having a normal position and rotatable in a first direction to selected off-normal positions and rotatable in a second direction from said selected off-normal positions to said normal position, an output terminal, a plurality of signal input terminals, first means controlled by said dial for each successive rotation to a selected off-normal position for sequentially coupling successive ones of said signal input terminals with said output terminal, and second means controlled by said dial when rotated from a selected one of said off-normal positions to said normal position for transmitting a signal indicative of said selected off-normal position to said output terminal.

3. A telephone signaling device comprising a dial having a normal position and rotatable in a first direction to selected off-normal positions and rotatable in a second direction from said selected off-normal positions to said normal position, a plurality of input terminals, a plurality of signal sources, means independent of said dial for selectively connecting said signal sources with said input terminals, an output terminal, first means controlled by said dial for each successive rotation to a selected off-normal position for sequentially coupling successive ones of said input terminals with said output terminal, and second means controlled by said dial when rotated from a selected one of said off-normal positions to said normal position for transmitting a second signal to said output terminal.

4. The invention defined in claim 4 wherein said first means comprises a plurality of contact means each connected to one of said input terminals, wiper means controlled by said dial to engage said contact means and means coupling said wiper means to said output terminal.

5. The invention defined in claim 5 wherein said first means also comprises commutator means connected to said wiper means and brush means engaging said commutator means to provide an electrical coupling between said wipers and said output terminal.

6. An arrangement for transmitting alternate first and second signals over a telephone line comprising a dial having a normal position and rotatable in a first direction to selected off-normal positions and rotatable in a second direction from said selected off-normal positions to said normal position; a plurality of first signal sources; a multi-position sequence switch adapted to be stepped to each said switch position for interconnecting said first signal sources with said line, said switch comprising contact means corresponding to each said switch position and means for selectively coupling each said contact means with said first signal sources independently of said dial, wiper means adapted to be driven off normal to sequentially engage said contact means when said switch is stepped, commutator means connected to said wiper means, means coupling said commutator means to said line, and a ratchet mechanism controlled by said dial on each rotation to a selected off-normal position for driving said wiper means to discrete positions to connect said signal sources through said commutator means and said coupling means to said line; and means controlled by said dial when rotated from a selected one of said off-normal positions to said normal positions for transmitting a second signal on said line.

7. The invention defined in claim 6 wherein said sequence switch also comprises means for restoring said wiper means to normal and detent means for maintaining said wiper means at said discrete off-normal positions.

8. The invention defined in claim 7 wherein means are provided for releasing said detent means to permit said restoring means to restore said wiper means to normal.

9. The invention defined in claim 8 wherein said detent releasing means includes means for disconnecting said coupling means from said telephone line.

10. A device for signaling over a telephone line comprising a dial having a finger wheel, a dial shaft coupled to said finger wheel and rotatable in opposite directions to alternately transmit first and second signals, a rotary stepping switch comprising an arcuate bank of contacts positioned in a fixed plane, means for selectively connecting first signal sources to said contacts, a rotatable ratchet wheel parallel to said plane, a pair of wipers connected to said ratchet wheel and positioned to engage successive pairs of said contacts when said ratchet wheel is rotated off-normal, a driving pawl coupled to said dial shaft for rotating said ratchet wheel one step for each rotation of said dial shaft in its first direction, a pair of commutators concentric to said ratchet wheel and each connected to a corresponding one of said wipers, brushes contiguous to said commutators for coupling said first signals with said telephone line, a motor spring for returning said ratchet wheel to normal and adapted to be tensioned when said ratchet wheel is rotated off-normal, a detent mechanism for maintaining said ratchet wheel off-normal, means for releasing said detent mechanism to permit said ratchet wheel to return to normal under control of said motor spring, and impulsing means governed by said dial shaft when rotated in a second direction for transmitting said second signals comprising dial pulses over said line.

11. In a communication system a calling line, a called line represented by a multidigit address code, a switching office connected to said lines, call transmitting means connected to said calling line comprising a dial rotatable in a first direction to selected off-normal positions and rotatable in a second direction from a selected off-normal position to said normal position, means independent of said dial for preselecting a plurality of control signals to comprise a word group, first means coupled to said dial and effective for each successive rotation of said dial to any said off-normal position for transmitting over said calling line one of said preselected control signals comprising said word group, second means coupled to said dial and effective when said dial is rotated from a particular selected off-normal position to said normal position for transmitting over said calling line digit signals indicative of said particular off-normal position, means at said office responsive to said high signals for interconnecting said calling and called lines, and means at said office responsive to said control signals for controlling said switching means in accordance with the particular series of control signals received.

12. In a communication system a calling line; a called line represented by a digital address code; a switching office connected to said lines; a calling device for alternately transmitting control signals and digital signals over said calling line to said switching office, said device comprising a rotatable dial for selecting particular digital signals to be transmitted, means separate from said dial for preselecting a combination of control signals to be transmitted, first means controlled by said dial and independent of the angular rotation of said dial in a first direction for transmitting one of said preselected control signals over said calling line to said switching office, and means controlled by said dial for transmitting over said calling line digital signals in accordance with the particular angular rotation of said dial in a second direction; means at said switching office responsive to said digital signals for interconnecting said calling and called lines and for enabling said control signals to be transmitted over said called line; and means coupled to said called line for receiving said control signals to acuate special station equipment thereat.

References Cited by the Examiner

UNITED STATES PATENTS 2,691,071 10/1954 MacCheyne ---------- 179—90

KATHLEEN H. CLAFFY, *Primary Examiner.*

H. ZELLER, *Assistant Examiner.*